US012282322B2

(12) United States Patent
Jinguu

(10) Patent No.: US 12,282,322 B2
(45) Date of Patent: Apr. 22, 2025

(54) APPARATUS, METHOD, AND COMPUTER-READABLE MEDIUM FOR INDICATING THE STATE OF A TARGET

(71) Applicant: Yokogawa Electric Corporation, Tokyo (JP)

(72) Inventor: Yoshiyuki Jinguu, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 25 days.

(21) Appl. No.: 17/686,427

(22) Filed: Mar. 4, 2022

(65) Prior Publication Data

US 2022/0308571 A1 Sep. 29, 2022

(30) Foreign Application Priority Data

Mar. 26, 2021 (JP) .................................. 2021-054166

(51) Int. Cl.
*G05B 23/02* (2006.01)

(52) U.S. Cl.
CPC ..... *G05B 23/0235* (2013.01); *G05B 23/0232* (2013.01); *G05B 23/024* (2013.01)

(58) Field of Classification Search
CPC ............ G05B 23/0235; G05B 23/0232; G05B 23/024
See application file for complete search history.

(56) References Cited

U.S. PATENT DOCUMENTS

| | | | |
|---|---|---|---|
| 2008/0167839 A1* | 7/2008 | Miller | G05B 23/021 703/2 |
| 2015/0222495 A1 | 8/2015 | Mehta | |
| 2017/0205819 A1* | 7/2017 | Machida | G05B 23/0291 |
| 2017/0284903 A1* | 10/2017 | Anderson | G01M 99/008 |
| 2021/0042570 A1* | 2/2021 | Iskandar | G06F 11/3075 |
| 2021/0240177 A1* | 8/2021 | Fujii | G05B 13/02 |
| 2022/0276130 A1* | 9/2022 | Tsuduki | G05B 23/024 |

(Continued)

FOREIGN PATENT DOCUMENTS

| | | | |
|---|---|---|---|
| EP | 1192512 B1 | 8/2003 | |
| JP | H07282373 A | * 10/1995 | ............. G05B 23/02 |

(Continued)

OTHER PUBLICATIONS

Machine Translation of JP H07282373 A, accessed Jul. 14, 2023 Espacenet Patent Search (Year: 1995).*

(Continued)

*Primary Examiner* — Mi'schita' Henson

(57) ABSTRACT

An apparatus is provided comprising an acquisition unit configured to acquire a plurality of types of measurement data indicating a state of a target, a supplying unit configured to supply, in response to the plurality of types of measurement data being input, measurement data acquired by the acquisition unit to a model that outputs a state indication value indicating a quality of a state of the target, a setting unit configured to set, as data to be displayed, at least one piece of measurement data, among the plurality of types of measurement data, having a larger influence on the state indication value than a reference, and a display control unit configured to display the state indication value output from the model along with a measurement value of the data to be displayed.

19 Claims, 7 Drawing Sheets

(56) References Cited

U.S. PATENT DOCUMENTS

2022/0357732 A1    11/2022  Takeda
2023/0280701 A1*    9/2023  Rodriguez Ramirez ....................
                                                          G05B 23/0221
                                                               700/13

FOREIGN PATENT DOCUMENTS

| JP | H10312213 A | 11/1998 | | |
|----|----|----|----|----|
| JP | 2013008111 A | 1/2013 | | |
| JP | 2014203432 A | 10/2014 | | |
| JP | 2016012240 A | 1/2016 | | |
| JP | WO2018083720 A1 * | 5/2018 | ......... | G05B 23/0243 |
| JP | 6453504 B1 | 1/2019 | | |
| JP | 2020047016 A | 3/2020 | | |
| JP | 2021018753 A | 2/2021 | | |
| SG | 10201601558 A1 | 10/2017 | | |

OTHER PUBLICATIONS

English translation of Foreign Patent Document CN108573072A (Year: 2018).*
Office Action issued for counterpart Japanese Application No. 2021-054166, issued by the Japanese Patent Office on Mar. 22, 2023 (drafted on Mar. 13, 2023).
Extended European Search Report for counterpart European Application No. 22161561.0, issued by the European Patent Office on Jul. 28, 2022.
Office Action issued for counterpart European Application No. 22161561.0, issued by the European Patent Office on Jul. 4, 2023.

* cited by examiner

APPARATUS, METHOD, AND COMPUTER-READABLE MEDIUM FOR INDICATING THE STATE OF A TARGET

The contents of the following Japanese patent application(s) are incorporated herein by reference:
2021-054166 filed in JP on Mar. 26, 2021

BACKGROUND

1. Technical Field

The present invention relates to an apparatus, a method, and a computer-readable medium.

2. Related Art

Patent document 1 describes that "the output unit 12c outputs, with sensor data collected by the collection unit 12a as an input, the abnormality degree of each detection target equipment 20, respectively, by using each model.

Prior Art Document

Patent Document

Patent Document 1: Japanese Patent No. 6453504

SUMMARY

The first aspect of the present invention provides an apparatus. The apparatus may include an acquisition unit configured to acquire a plurality of types of measurement data indicating a state of a target. The apparatus may include a supplying unit configured to supply, in response to the plurality of types of measurement data being input, measurement data acquired by the acquisition unit to a model that outputs a state indication value indicating a quality of a state of the target. The apparatus may include a setting unit configured to set, as data to be displayed, at least one piece of measurement data, among the plurality of types of measurement data, having a larger influence on the state indication value than a reference. The apparatus may include a display control unit configured to display the state indication value output from the model along with a measurement value of the data to be displayed.

A second aspect of the present invention provides a method. The method may include setting, as data to be displayed, at least one piece of measurement data having a larger influence than a reference on a state indication value indicating a quality of a state of a target that is output from a model in response to a plurality of types of measurement data indicating a state of the target being input. The method may include acquiring the plurality of types of measurement data. The method may include supplying, to the model, the measurement data acquired in the acquiring step. The method may include controlling display by displaying the state indication value output from the model along with a measurement value of the data to be displayed.

A third aspect of the present invention provides a computer-readable medium having recorded thereon a program. The program may cause the computer to function as an acquisition unit configured to acquire a plurality of types of measurement data indicating a state of a target. The program may cause the computer to function as a supplying unit configured to supply, in response to the plurality of types of measurement data being input, measurement data acquired by the acquisition unit to a model that outputs a state indication value indicating a quality of a state of the target. The program may cause the computer to function as a setting unit configured to set, as data to be displayed, at least one piece of measurement data, among the plurality of types of measurement data, having a larger influence on the state indication value than a reference. The program may cause the computer to function as a display control unit configured to display the state indication value output from the model along with a measurement value of the data to be displayed.

A fourth aspect of the present invention provides a computer-readable medium having recorded a program. The program may cause the computer to function as a setting unit configured to set, as data to be displayed, at least one piece of measurement data having a larger influence on the state indication value of a model that outputs a state indication value indicating a quality of a state of the target than a reference, in response to a plurality of types of measurement data indicating the state of the target being input. The program may cause the computer to function as a display control unit configured to display the state indication value output from the model along with a measurement value of the data to be displayed.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

1. Configuration of System 1

Figure 1:
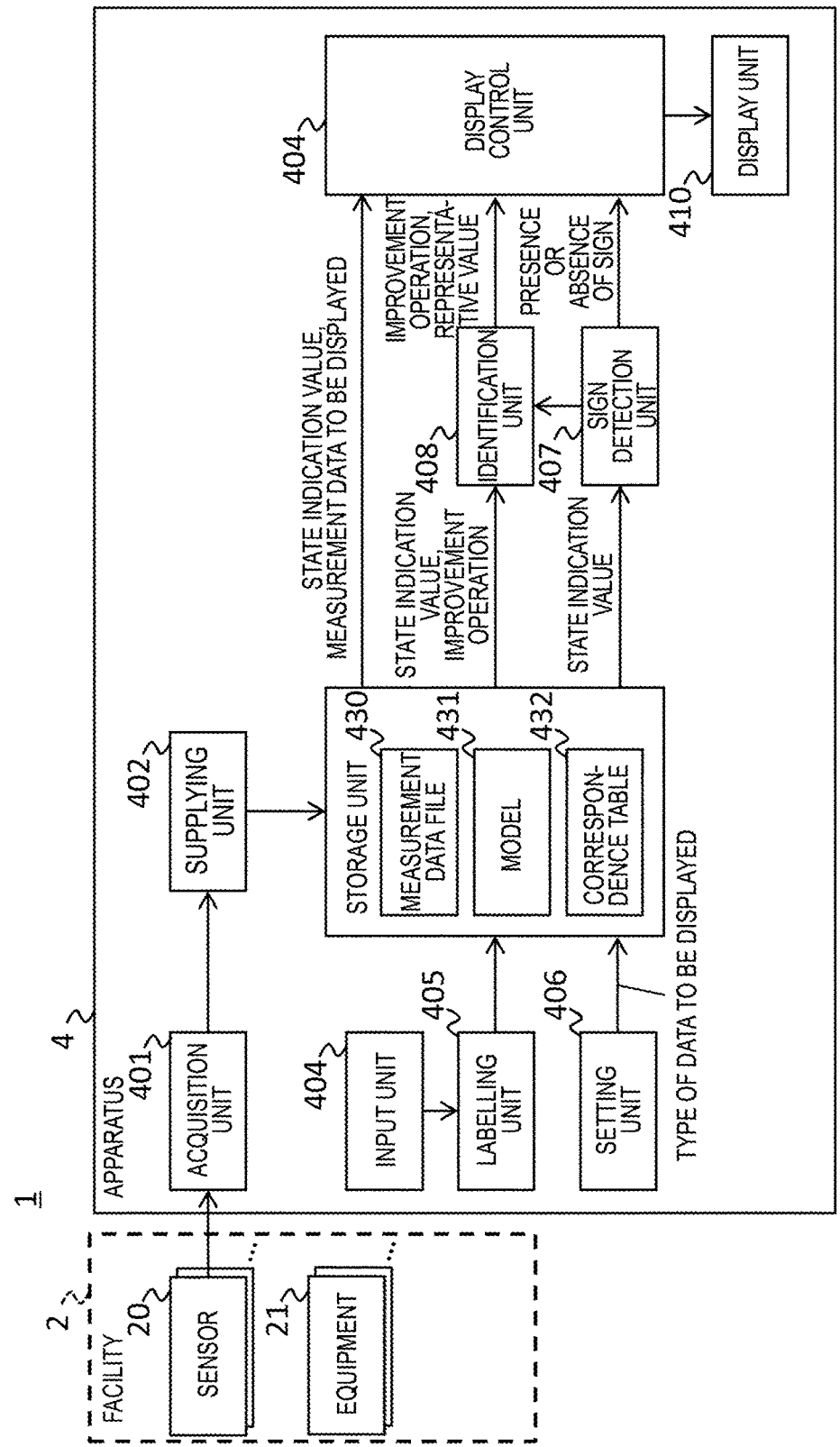
FIG. 1 illustrates a system 1 according to an embodiment.

FIG. 1 illustrates a system 1 according to the present embodiment. The system 1 assists monitoring of a state of a target, and includes a facility 2 and an apparatus 4 as examples of the target.

1.1 Facility 2

The facility 2 is provided with one or more sensors 20. For example, the facility 2 may be a plant provided with a plurality of equipment 21, or may be a combined apparatus in which a plurality of equipment 21 is combined. Examples of the plant include, in addition to industrial plants such as chemical plants and bio plants, plants that manage and control well sources such as gas fields and oil fields and surroundings thereof, plants that manage and control power generation such as hydraulic power, thermal power, and nuclear power, plants that manage and control environmental power generation such as solar power and wind power, and plants that manage and control water supplies/sewage, dams, and the like.

1.1-1. Equipment 21

Each piece of equipment 21 is an instrument, a machine, or an apparatus, and may be, for example, an actuator such as a valve, a pump, a heater, a fan, a motor, or a switch that controls at least one physical quantity such as pressure, temperature, pH, speed, or flow rate in a process of the facility 2. Respective pieces of equipment 21 may be of different types, or at least some (two or more) pieces of equipment 21 may be of the same type. In the present embodiment, as one example, the equipment 21 is controlled from the outside in a wired or wireless manner, but may be controlled manually.

1.1-2. Sensor 20

Each sensor 20 measures the state of the facility 2. The sensor 20 may measure at least one physical quantity such as pressure, temperature, pH, speed, flow rate, and the like. In addition, the sensor 20 may measure the yield of the facility 2, the proportion of impurities to be mixed, the operation status of each piece of equipment 21, and the like. Respective sensors 20 may be of different types, or at least some (two or more) of the sensors 20 may be of the same type. As one example, the plurality of sensors 20 may be a temperature sensor provided at separate locations in a furnace within the facility 2. Each sensor 20 may supply the measurement data to the apparatus 4.

It should be noted that, communication between the sensor 20 and the apparatus 4 may be performed, for example, with an ISA (International Society of Automation) wireless communication protocol, and may be performed using ISA 100, HART (Highway Addressable Remote Transducer) (registered trademark), BRAIN (registered trademark), FOUNDATION Fieldbus, PROFIBUS, or the like, as one example.

1.2. Apparatus 4

The apparatus 4 assists monitoring of the facility 2 by using a learned model 431. The apparatus 4 has an acquisition unit 401, a supplying unit 402, a storage unit 403, an input unit 404, a labeling unit 405, a setting unit 406, a sign detection unit 407, an identification unit 408, a display control unit 409, and a display unit 410.

1.2-.1. Acquisition Unit 401

The acquisition unit 401 acquires a plurality of types of measurement data indicating a state of the facility 2. The acquisition unit 401 may sequentially acquire each type of measurement data from each sensor 20. It should be noted that, the type of measurement data may be different for each sensor 20, as one example in the present embodiment, but may be different depending on physical quantities to be measured. The acquisition unit 401 may supply the acquired measurement data to the supplying unit 41.

1.2-2. Supplying Unit 402

The supplying unit 402 supplies the measurement data acquired by the acquisition unit 401 to the model 431. In the present embodiment, as one example, the model 431 is stored in the storage unit 403 described later, and the supplying unit 402 may supply the measurement data to the model 431 in the storage unit 403.

In addition, the supplying unit 402 may store the measurement data in the storage unit 403. The supplying unit 402 may add to the measurement data the measurement time and the identification information of the sensor 20 for which the measurement was performed, and record the same in the storage unit 43. The measurement time of the measurement data may be the time at which measurement for said measurement data was performed, and may indicate the elapsed time from the starting time of the processing executed at the facility 2. The measurement time of the measurement data may be the acquisition time of the measurement data by the acquisition unit 401. It should be noted that, the measurement time and the identification information of the sensor 20 may be added in advance to the measurement data supplied from the sensor 20.

1.2-3. Storage Unit 403

The storage unit 403 stores various types of information. For example, the storage unit 43 may store a measurement data file 430, a learned model 431, and a correspondence table 432.

1.2-3-2. Measurement Data File 430

The measurement data file 430 stores the measurement data supplied from the supplying unit 402.

1.2-3-1. Model 431

The model 431 outputs a state indication value indicating the quality of a state of the facility 2 in response to the plurality of types of measurement data being input. The model 431 may output the state indication value (also referred to as a health index) that is not binarized into a value indicating that the target is in a good state and a value indicating that the target is in a poor state. For example, the model 431 may be a model for which learning have been performed using binary with a value indicating that the facility 2 is in a good state and a value indicating that the facility 2 is in a poor state, and may output a state indication value before binarizing by comparison with the threshold. In the present embodiment, as one example, the state indication value may be a positive value when the facility 2 is in a good state (or when it is in a nearly good state), and the state indication value may be a negative value when the facility 2 is in a poor state (or when it is in a nearly poor state). The model 431 may be a support vector machine, for example, but may also be a model for which learning have been performed by other algorithms such as logistic regression, decision tree, or neural network.

1.2-3-3. Correspondence Table 432

The correspondence table 432 associates an operation for improving the measurement value of said measurement data (also referred to as improvement operation) with each type of measurement data for which measurement is performed by the sensor 20, and stores the same. The improvement operation may be operation of any equipment 21 in the facility 2, and may be an operation of equipment 21 that is directly related to the measurement value of the target to be improved, or may be an operation of the equipment 21 that is not directly related. As one example, in a case where the measurement value for the measurement data of the temperature is too high, the improvement operation for improving said measurement value may be an operation to lower the output of a heater near the measurement location, may be an operation to change the opening of a valve for adjusting the flow rate of a fluid flowing near the measurement location, or may be an operation to change a set point of flowmeter for measuring said flow rate. The content of the correspondence table 432 may be preset through trial and error.

1.2-4. Input Unit 404

The input unit 404 receives operation input from the operator. In the present embodiment, as one example, in a case where the measurement data is displayed, the input unit 404 may receive an operation for providing the measurement data with a label indicating the quality of a state of the facility 2. The input unit 404 may supply a signal indicating that the operation has been performed to the labeling unit 405.

1.2-5. Labeling Unit 405

The labeling unit 405 provides each piece of measurement data with a label indicating a quality of a state of the facility 2 in response to an operation by the operator. The labeling unit 405 may provide a corresponding piece of measurement data in the storage unit 403 with a label indicating a good state or a poor state.

1.2-6. Setting Unit 406

The setting unit 406 sets, as data to be displayed, at least one piece of measurement data, among the plurality of types of measurement data, having a larger influence on the state indication value than a reference. The data to be displayed may become important data in monitoring the facility 2.

The setting unit 406 may set, as the data to be displayed, measurement data of a reference number (the top five pieces as one example in the present embodiment) having the largest degree of influence on the state indication value, among the plurality of types of measurement data. In this case, the setting unit 406 may set, as the reference degree, the larger influence degrees in order from the reference number+1, among the influence degree of each piece of measurement data. The influence degree of each type of measurement data on the state indication value may be calculated, for example, by conventionally known techniques, such as Permutation Importance, LIME or the like. The setting unit 406 may provide the measurement data that is the data to be displayed, among each type of setting data in the storage unit 403, with a tag indicating the it is the data to be displayed.

The setting unit 406 may calculate the degree of influence on the state indication value for each type of measurement data, to set the data to be displayed. Alternatively, the setting unit 406 may set, as the data to be displayed, measurement data specified by the operator via the input unit 404.

1.2-7. Sign Detection Unit 407

The sign detection unit 407 is one example of the detection unit, and detects a sign indicating that a state of the facility 2 is becoming poor based on a transition of the state indication value. For example, the sign detection unit 407 may compare the distribution of the state indication value in the most recent period with a reference distribution to detect a sign. In the present embodiment, as one example, the sign detection unit 407 may detect that there is a sign in response to the distribution within the most recent reference time period becoming greater than the reference distribution. The reference time period and the reference distribution may be set arbitrarily. The sign detection unit 407 may supply the detection result of the sign to the identification unit 408 and the display control unit 409.

1.2-8. Identification Unit 408

The identification unit 408 identifies the type of measurement data that caused the poor state (also referred to as factor data), in a case where it is indicated by the state indication value that the facility 2 is in a poorer state than the reference. In the present embodiment, as one example, the identification unit 408 may use, as the reference for identifying the factor data, whether a sign of poor state is detected by the sign detection unit 407, and may identify the factor data in a case where the sign is detected.

The identification unit 408 may identify, as the factor data, the measurement data having the largest amount of deviation from the representative value (as one example, the average value, the median or the mode) of each piece of measurement data when the facility 2 is in a good state. It should be noted that, in the present embodiment, as one example, the representative value is calculated by the identification unit 408, but it may be stored in the storage unit 403 in advance as a fixed value.

In addition, the identification unit 408 may further identify an improvement operation for improving the measurement value of the factor data. The identification unit 408 may identify the improvement operation associated with the type of factor data in the correspondence table 432. The identification unit may supply the representative value of each piece of data to be displayed and the content of the improvement operation to the display control unit 409.

1.2-9. Display Control Unit 409

The display control unit 409 controls the display unit 410. The display control unit 409 may display the state indication value output from the model 431 along with the measurement value of the data to be displayed. Displaying the state indication value along with the measurement value may mean to display them together. As one example, the display control unit 409 may display the state indication value and the measurement value on the same screen of the display unit 410, or may display them on a separate screen.

The display control unit 409 may display the state indication value at one point in time (the latest state indication value, as one example), or may display the state indication value at a plurality of points in time. In a case where the state indication value at a plurality of points in time is displayed, the display control unit 409 may display the transition in the state indication value output from the model 431 at the most recent plurality of points in time.

In addition, the display control unit 409 may display only one measurement value for each type of data to be displayed, or may display a plurality of measurement values. In a case where only one measurement value is displayed for one type of data to be displayed, the display control unit 409 may display the measurement value measured at one point in time (the latest measurement value, as one example), or may display the moving average value of the measurement value measured at a plurality of points in time (the moving average value during the most recent period, as one example). In a case where a plurality of measurement values are displayed for one type of data to be displayed, the display control unit 409 may display the transition in the measurement value measured at the most recent plurality of points in time.

The display control unit 409 may display the representative value of a measurement value of each piece of data to be displayed when the facility 2 is in a good state, and the measurement value of the data to be displayed together. The display control unit 409 may display the measurement value and the representative value in association with each other for each type of data to be displayed.

The display control unit 409 may further display that a sign indicating that a state of the facility 2 is becoming poor has been detected by the sign detection unit 407. For example, the display control unit 409 may display a message indicating that the sign has been detected.

The display control unit 409 may further display the improvement operation for improving the factor data that caused the poor state. In the present embodiment, as one example, the display control unit 409 may display the content of the improvement operation identified by the identification unit 408.

1.2-10. Display Unit 410

The display unit 410 performs display under control by the display control unit 409. It should be noted that, in the present embodiment, as one example, the display unit 410 is equipped in the apparatus 4, but may be externally connected to the apparatus 4.

According to the apparatus 4 in the system 1 described above, the state indication value of the facility 2 is output from the model 431 in response to the measurement data being input, and said state indication value is displayed along with the measurement value of the data to be displayed having a larger influence on the state indication value. Therefore, the state of the facility 2 and the important measurement values with respect to the state can be collectively checked.

In addition, since the representative value of the measurement value of each piece of data to be displayed when the facility 2 is in a good state is displayed together with the measurement value of the data to be displayed, it can be immediately grasped how much the measurement value of the data to be displayed is deviated from the representative value.

In addition, since the measurement data of a reference number, among the plurality of types of measurement data, having the largest degree of influence on the state indication value is set as the data to be displayed, by setting, in advance as the reference number, a number of measurement data that can be grasped by the operator, in a case of a poor state, it can be ensured that the measurement data causing the failure is identified.

In addition, since the model 431 outputs the state indication value that is not binarized into a value indicating that the facility 2 is in a good state and a value indicating that the facility 2 is in a poor state, it is possible to grasp the degree of the state being good or poor.

In addition, in a case where, for each type of measurement data (as one example, the data to be displayed), an operation for improving the measurement value for said measurement data is stored in association therewith and the state indication value indicating that the state of facility 2 is poor is displayed, the operation associated with the type of measurement data that caused the poor state is displayed. Therefore, an operation for improving the state can be grasped and executed immediately.

In addition, since the sign indicating that a state of the facility 2 is becoming poor is detected and displayed based on the transition in the state indication value, the poor state can be grasped in advance.

In addition, since the sign is detect in response to the distribution of the state indication value in the most recent period becoming greater than the reference distribution, the sign can be detected in response to variation and fluctuation in the state indication value.

2. Operation

Figure 2:
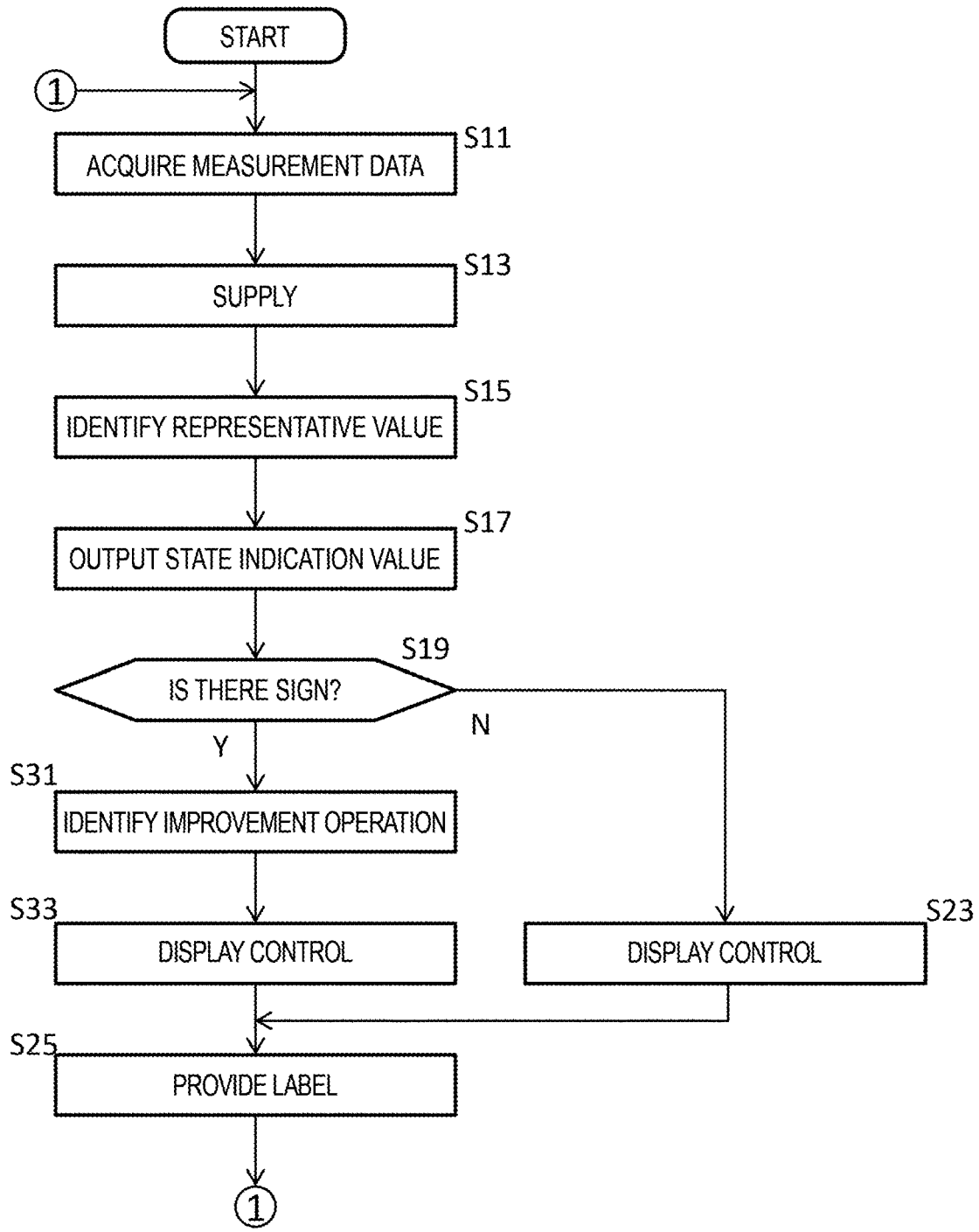
FIG. 2 illustrates an operation of an apparatus 4.

FIG. 2 illustrates an operation of an apparatus 4. The apparatus 4 assists monitoring of the facility 2 by the processing of steps S11 to S33. It should be noted that, this operation may start in response to the facility 2 being activated. In addition, at the starting time point of the operation, the model 431 may be stored in the storage unit 403. In addition, at least one (as one example in the present embodiment, five) of the measurement data, among the plurality of types of measurement data measured at the facility 2, having a larger influence on the state indication value than the reference may be preset as the data to be displayed.

At step S11, the acquisition unit 401 acquires a plurality of types of measurement data indicating a state of the facility 2.

At step S13, the supplying unit 402 supplies the acquired measurement data to the model 431. In addition, the supplying unit 402 may cause the measurement data to be stored in the storage unit 403.

At step S15, the identification unit 408 calculates a representative value (as one example, the average value, the median, the mode) of each piece of measurement data when the facility 2 is in a good state. The identification unit 408 may calculate the representative value from the measurement data, among the measurement data stored in the storage unit 403, provided with a label indicating that the facility 2 was in a good state.

At step S17, the model 431 outputs, to the display control unit 409 and the sign detection unit 407, a state indication value according to the plurality of types of measurement data that was supplied. In the present embodiment, as one example, the model 431 may output a state indication value that is not binarized. In addition, the model 431 may output a state indication value according to a plurality of types of time series measurement data measured at one point in time, but the may output a state indication value according to a plurality of types of time series measurement data measured at a plurality of point in time.

At step S19, based on the transition in the state indication value, the sign detection unit 407 of the apparatus 4 attempts to detect a sign indicating that a state of the facility 2 is becoming poor, and determines whether the sign has been detected. When it is determined that the sign has been detected (step S19: Yes), the processing may proceed to step S31. When it is determined that the sign is not detected (step S19: No), the processing may proceed to step S23.

At step S23, the display control unit 409 displays, on the display unit 410, the state indication value output from the model 431 to be displayed along with the measurement value of the data to be displayed. The display control unit 409 may read and display the data to be displayed that has been set as the display target by the setting unit 406 in advance, among the variety of types of measurement data stored in the storage unit 403.

In addition, the display control unit 409 displays the representative value of a measurement value of each piece of data to be displayed when the facility 2 is in a good state, and the measurement value of the data to be displayed together. In addition, the display control unit 409 may display, for each piece of data to be displayed, the representative value thereof and the most recent measurement value as a graph. The graph may be a bar chart or may be a radar chart. The display control unit 409 may display a scale indicating the reference divergence from the representative value in the graph. The reference divergence may be $1\sigma$, $2\sigma$, or $3\sigma$ when the distribution of measurement value in the measurement data is considered to be a normal distribution. $\sigma$ may be a standard deviation of the measurement value.

At step S25, the labeling unit 405 provides each piece of measurement data measured at a point in time specified by the operator with a label. The specified time point may be the current time point, or may be a point in time at which the data to be displayed that is displayed or the measurement data corresponding to the state indication value was measured. In addition, the specified time point may be one point in time, or may be a plurality of points in time that are consecutive or inconsecutive.

For example, in a case where any of the data to be displayed that are currently displayed or the state indication value is designated by the operator via the input unit 404, the labeling unit 405 may identify, as the specified time point, the measurement time of the data to be displayed that is the specified target, or the measurement time of the data to be displayed corresponding to the state indication value that is the specified target. The labeling unit 405 may provide each piece of measurement data (as one example, the measurement data set as the data to be displayed, and measurement data not set as the data to be displayed) in the storage unit 403 that was measured at the identified measurement time with a label.

In response to an operation indicating a good state being performed on the input unit 404, the labeling unit 405 may provide the measurement data with a label indicating the same. Similarly, in response to an operation indicating a poor state being performed on the input unit 404, the labeling unit 405 may provide the measurement data with a label indicating the same. When the processing of step S25 is ended, the processing may proceed to step S11.

At step S31, the identification unit 408 identifies a factor data that caused the poor state, and further identifies an improvement operation for improving the measurement value of the factor data. The identification unit 408 may identify the factor data, among the plurality of data to be displayed, based on the tag of the data to be displayed with which the measurement data is provided in the storage unit 403.

At step S33, similarly to the processing at step S23, the display control unit 409 displays, on the display unit 410, the state indication value output from the model 431 to be displayed along with the measurement value of the data to be displayed.

Note that, in the processing of step S33, the display control unit 409 may further display a message indicating that a sign of a poor state has been detected. In addition, instead of display the plurality of data to be displayed together with the state indication value, the display control unit 409 may display only the factor data, among the plurality of data to be displayed, that caused the poor state together with the state indication value. In addition, the display control unit 409 may further display the improvement operation for improving the factor data. When the processing of step S33 is ended, the processing may proceed to step S25.

According to the operation described above, since, for each piece of data to be displayed, the representative value thereof and the most recent measurement value are displayed as a graph, it is possible to easily grasp the degree of deviation of the most recent measurement value of the data to be displayed from the representative value.

In addition, since a scale indicating the reference divergence from the representative value is display in the graph, it is possible to further easily grasp the degree of degree of deviation of the most recent measurement value of the data to be displayed from the representative value.

In addition, since the measurement data is provided with a label indicating the quality of the state of the target, learning of the model 431 can be performed using the measurement data provided with the label. In addition, since each piece of measurement data measured at a point in time specified by the operator is provided with a label, provision of the label can be performed easily.

3. Operation Example

Figure 3:
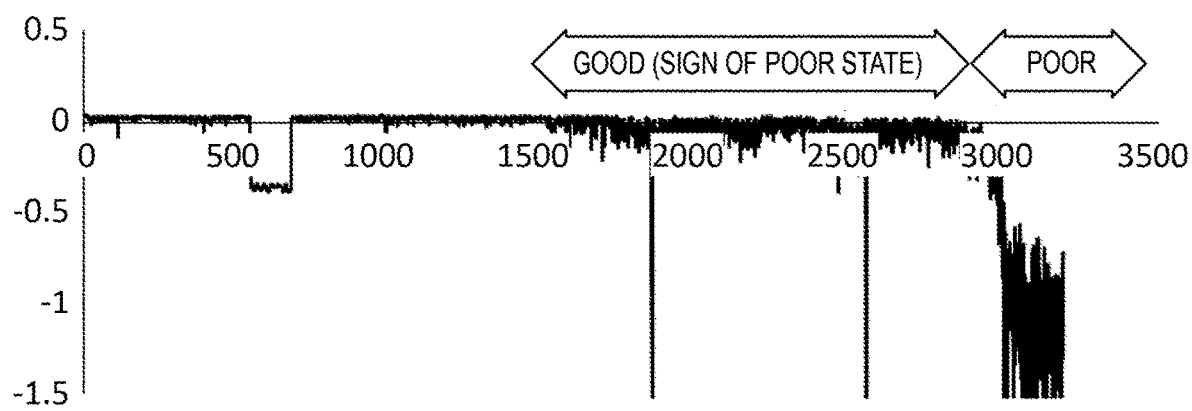
FIG. 3 illustrates a transition of the state indication value.

FIG. 3 illustrates a transition in the state indication value. In the figure, the horizontal axis indicates the time and the vertical axis indicates the state indication value. As illustrated in this figure, it is detected that there is a sign of a poor state as the distribution in the state indication value becomes larger. In this way, it is possible to grasp in advance that the state is becoming poor.

Figure 4:
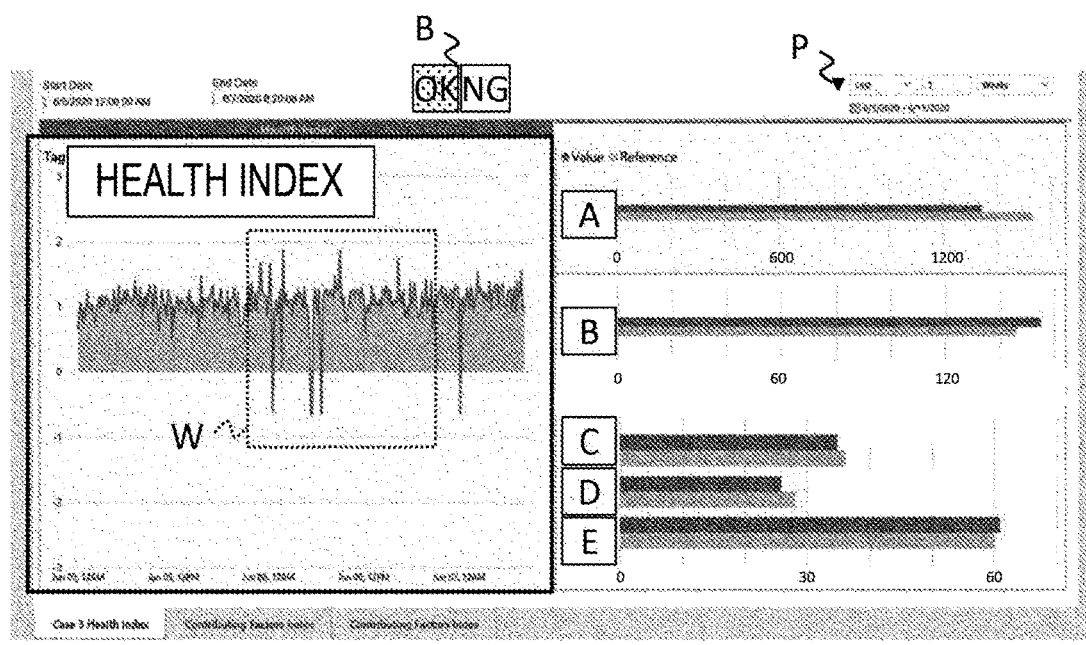
FIG. 4 illustrates an example of a display screen.

FIG. 4 illustrates an example of a display screen. The transition in the state indication value and a plurality of data to be displayed may be displayed on the display screen of the display unit 410. In the present drawing, as one example, the transition in the state indication value, that is, the health index is displayed on the left side of the display screen, and the most recent measurement value of each of the data to be displayed "A" to "E" and the representative value thereof are displayed on the right side of the display screen as a bar chart arranged vertically.

In addition, a pull-down menu P for selecting a display target period of the state indication value is may be displayed on the display screen. When any period is selected by the selection in the pull-down menu P, the state indication value during that period and the data to be displayed at the ending time point of that period may be displayed. It should be noted that, in the present drawing, as one example, "Last" mean the most recent period is selected in the pull-down menu P, and the state indication value during the most recent period and the data to be displayed at the most recent point in time are displayed.

In addition, a quality button B for selecting the type of the label to be provided to the measurement data may be displayed on the display screen. The quality button B may include an "OK" button and an "NG" button, and the when the "OK" or "NG" button is operated, each piece of the latest measurement data may be provided with a label indicating that the state of the facility 2 was good or poor.

In addition, in response to an operation by the operator, a grid line W specifying any period within the display target period may be displayed on the display screen. The grid line W may specify the range of at least part of the transition in the state indication value or the data to be displayed at a plurality of points in time. A label may be provided to each piece of measurement data measured within the period specified with the grid line W by the labeling unit 405 in response to an operation of the quality button B.

Figure 5:
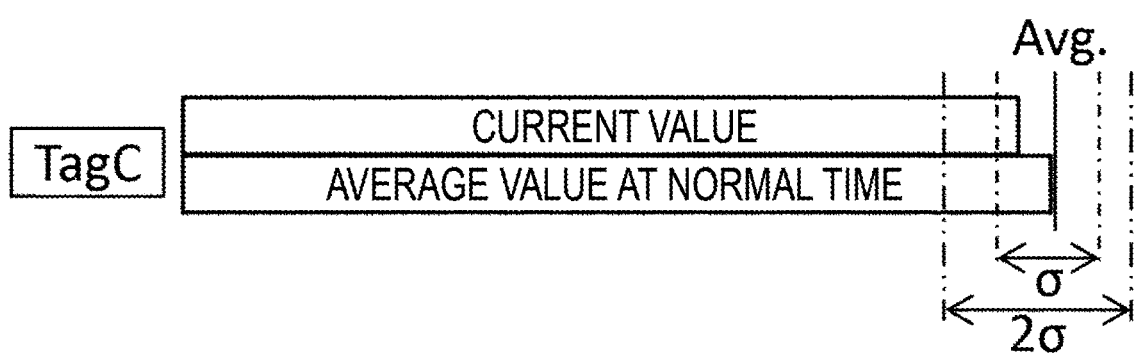
FIG. 5 illustrates another display example of data to be displayed.

FIG. 5 illustrates another display example of the data to be displayed. A scale indicating a reference divergence from the representative value may be displayed in the graph of the data to be displayed. In the present drawing, as one example, a scale indicating a section that is apart from the average value by a or 2a is displayed.

Figure 6:
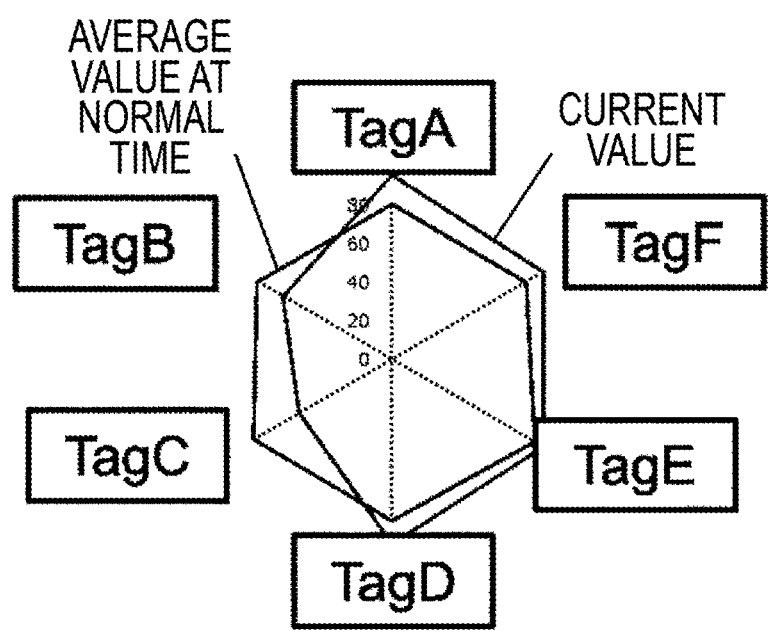
FIG. 6 illustrates another display example of data to be displayed.

FIG. 6 illustrates another display example of the data to be displayed. The representative value and the most recent measurement value of the data to be displayed may be displayed as graph in a radar chart format.

4. Variation Example

It should be noted that, in the embodiments described above, description has been made with the apparatus 4 having the storage unit 403, the input unit 404, the labeling unit 405, the sign detection unit 407, the identification unit 408, and the display unit 410, but the apparatus 4 may not include any of the above. For example, in a case where the apparatus 4 does not include a storage unit 403, the apparatus 4 may be externally connected to a storage apparatus that stores the content In the same manner as the storage unit 403.

In addition, description has been made with the identification unit 408 identifying the improvement operation when a sign of poor state is detected, but it may identify the improvement operation when the state indication value is lower than the threshold.

In addition, description has been made with the sign detection unit 407 detecting a sign by comparing the distribution of the state indication value with the reference distribution, but additionally, or alternatively, the sign detection unit 407 may detect the sign by comparing the state indication value with a preset threshold. In a case where the sign is detected by comparison of the distribution of the and the state indication value and the reference distribution, and comparison of the state indication value and the threshold, the sign may be detected by taking a logical sum of the two comparison results, or the sign may be detected by taking the logical product thereof. In a case where the state indication value and the threshold are compared, the sign detection unit 407 may detect the sign by comparing the moving average of the state indication value and a preset threshold. The moving average of the state indication value may be the moving average of the state indication value output from the model 431 during the reference time period, or may be the moving average of the state indication value output during the most recent reference time period, as one example. In a case where the sign is detected by comparing the moving average of the state indication value and the threshold, detection of the sign can be prevented from becoming unstable in response to the variation in the state indication value near the threshold. Here, the threshold may be set based on the boundary value between the state indication value indicating that the facility 2 is in a good state and the state indication value indicating that the facility 2 is in a poor state. As one example, in a case where the state indication value indicating that the facility 2 is in a good state is a positive value, the state indication value indicating that the facility 2 is in a poor state is a negative value, and the boundary value is zero, the threshold may be a positive value obtained by adding a reference margin to zero.

In addition, description has been made as the setting unit 406 setting, as the data to be displayed, measurement data of a reference number (as one example, five) having the largest degree of influence on the state indication value, but the setting unit 406 may set, as the data to be displayed, any measurement data selected by the operator. In addition, the setting unit 406 may set, as the data to be displayed, measurement data having a larger degree of influence on the state indication value than a reference degree, among the plurality of types of measurement data, and further, may set, as the data to be displayed, measurement data of a reference number having the largest amount of deviation between the representative value of the measurement value when the facility 2 is in a good state and the most recent measurement value. In a case where the measurement data having a larger degree of influence on the state indication value than the reference influence degree is set as the data to be displayed, it is possible to prevent measurement data having a small degree of influence from being displayed. Therefore, in the event of a poor state, it can be ensured that the measurement data that caused it is identified. In a case where the measurement data of a reference number having the largest amount of deviation is set as the data to be displayed, since the data to be displayed is reduced to a reference number, in the event of a poor state, the measurement data that caused it can be easily identified. It should be noted that, the reference degree may be any degree, and may be preset by the operator or the like.

In addition, description has been made as the representative value of the measurement data being calculated by the identification unit 408 each time the processing of step S15 is performed, but the representative value of the measurement data may be calculated in advance based on past measurement data measured when the facility 2 was in a good state and stored in the storage unit 403.

In addition, description has been made with the facility 2 as the target, but the target may be other objects. For example, the target may be a product produced at the facility 2, the target may be equipment or an apparatus that is not fixed and is movable, may be a natural object such as a living body, may be natural environment such as the weather or topography, or may be natural phenomenon such as chemical reactions or biochemical reactions.

In addition, various embodiments of the present invention may be described with reference to flow charts and block diagrams, where blocks may represent (1) steps of processes in which operations are executed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Note that dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having instructions stored thereon comprises an article of manufacture including instructions which can be executed to create means for performing operations specified in the flow charts or block diagrams. Examples of computer-readable media may include an electronic storage medium, a magnetic storage medium, an optical storage medium, an electromagnetic storage medium, a semiconductor storage medium, etc. More specific examples of the computer-readable medium may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flow charts or block diagrams. Examples of the processor include a computer processor, a processing unit, a microprocessor, a digital signal processor, a controller, a microcontroller, and the like.

Figure 7:
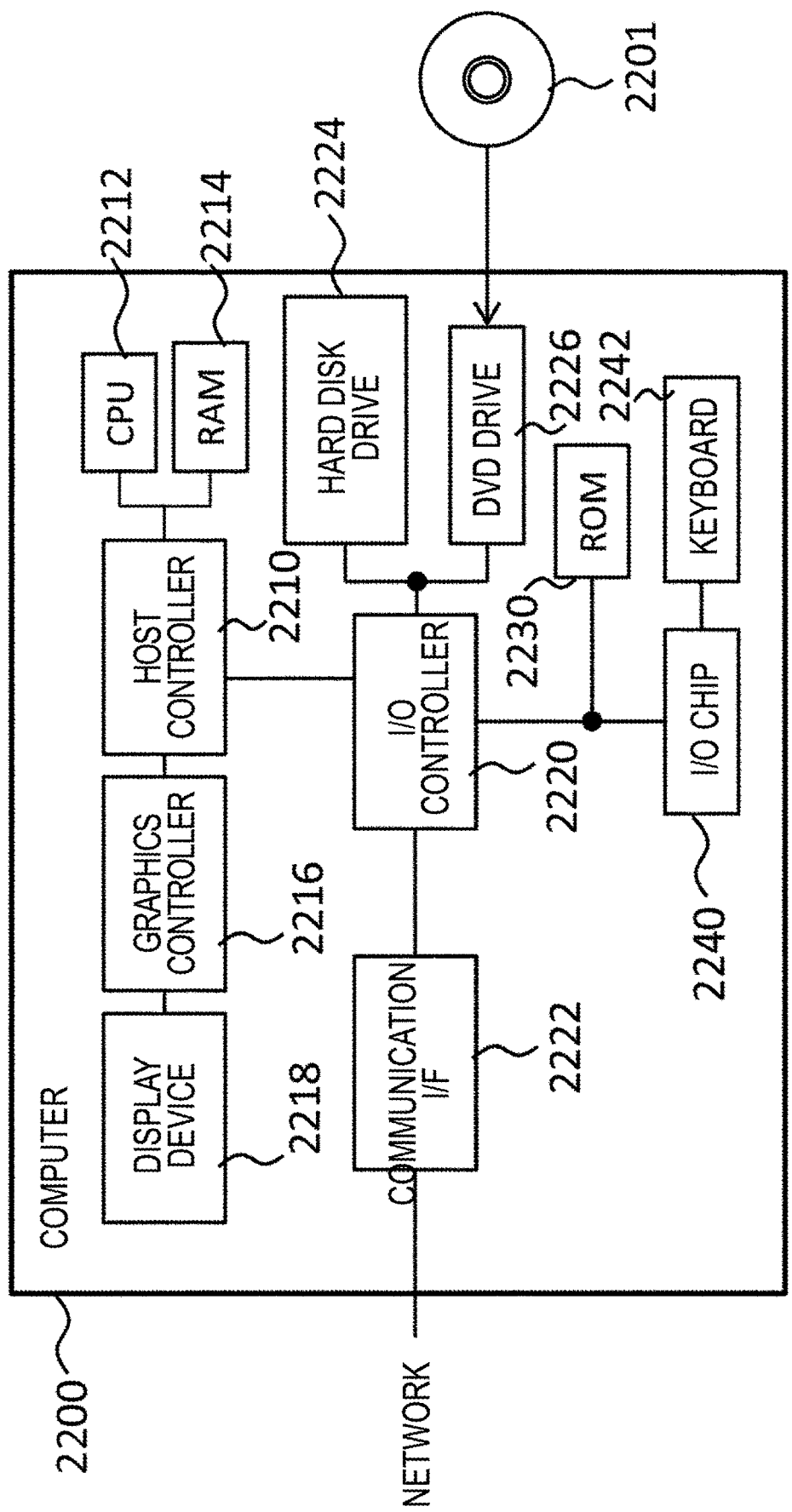
FIG. 7 illustrates an example of a computer 2200 in which a plurality of aspects of the present invention may be entirely or partially embodied.

FIG. 7 illustrates an example of the computer 2200 in which a plurality of aspects of the present invention entirely or partially may be embodied. A program installed on the computer 2200 can cause the computer 2200 to function as an operation associated with an apparatus according to embodiments of the present invention or as one or more "unit(s)" of the apparatus, or to perform the operation or the one or more "unit(s)", and/or can cause the computer 2200 to perform processes according to embodiments of the present invention or steps of the processes. Such a program may be executed by a CPU 2212 to cause the computer 2200 to perform particular operations associated with some or all blocks in the flow charts or block diagrams described herein.

The computer 2200 according to the present embodiment includes a CPU 2212, a RAM 2214, a graphics controller 2216 and a display device 2218, which are connected to each other by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates in accordance with programs stored in the ROM 2230 and the RAM 2214, and controls each unit accordingly. The graphics controller 2216 acquires image data generated by the CPU 2212 on a frame buffer or the like provided in the RAM 2214 or in the graphics controller 2216 itself, and displays the image data on the display device 2218.

The communication interface 2222 communicates with other electronic devices via a network. The hard disk drive 2224 stores programs and data to be used by the CPU 2212 in the computer 2200. The DVD-ROM drive 2226 reads programs or data from the DVD-ROM 2201, and provides the programs or data to the hard disk drive 2224 via the RAM 2214. The IC card drive reads the program and data from the IC card, and/or writes the program and data to the IC card.

The ROM 2230 has stored therein a boot program or the like to be executed by the computer 2200 at the time of activation, and/or a program that depends on the hardware of the computer 2200. The input/output chip 2240 may also connect various input/output units to the input/output controller 2220 via a parallel port, a serial port, a keyboard port, a mouse port or the like.

Programs are provided by a computer-readable medium such as the DVD-ROM 2201 or an IC card. The programs are read from the computer-readable medium, installed on the hard disk drive 2224, the RAM 2214 or the ROM 2230, which are also examples of a computer-readable medium, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, if a communication is performed between the computer 2200 and external devices, the CPU 2212 may execute a communication program loaded on the RAM 2214, and instruct the communication interface 2222 to perform communication process based on the process described in the communication program. Under the control of the CPU 2212, the communication interface 2222 reads transmission data stored in a transmission buffer region provided in a recording medium such as the RAM 2214, the hard disk drive 2224, the DVD-ROM 2201 or an IC card, and sends the read transmission data to the network, or writes reception data received from the network into a reception buffer region or the like provided in the recording medium.

The CPU 2212 may also make all or required portions of the files or databases stored in an external recording medium such as the hard disk drive 2224, the DVD-ROM drive 2226 (DVD-ROM 2201) or an IC card to be read by the RAM 2214, and perform various types of processing on the data on the RAM 2214. The CPU 2212 may be configured to write back the processed data to the external recording medium.

Various types of information such as various types of programs, data, tables and databases may be stored in the recording medium for information processing. The CPU 2212 may also be configured to execute various types of processing on the data read from the RAM 2214, which includes various types of operations, processing of information, condition judging, conditional branching, unconditional branching, search/replacement of information and the like described in the present disclosure and designated by an instruction sequence of programs, and to write the result back to the RAM 2214. The CPU 2212 may also be configured to search for information in a file, a database, etc., in the recording medium. For example, when a plurality of entries, each having an attribute value of a first attribute associated with an attribute value of a second attribute, are stored in the recording medium, the CPU 2212 may search the plurality of entries for an entry whose attribute value of the first attribute matches a designated condition, read the attribute value of the second attribute stored in the entry, and thereby acquire the attribute value of the second attribute associated with the first attribute that meets a predetermined condition.

The programs or software modules in the above description may be stored on the computer 2200 or a computer-readable medium near the computer 2200. Furthermore, a recording medium such as a hard disk or a RAM provided in a server system connected to a dedicated communication network or the Internet can be used as a computer-readable media, which provides programs to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: system,
2: facility,
4: apparatus,
20: sensor,
21: equipment,
41: supplying unit,
43: storage unit,
401: acquisition unit,
402: supplying unit,
403: storage unit,
404: input unit,
405: labeling unit,
406: setting unit,
407: sign detection unit,
408: identification unit,
409: display control unit,
410: display unit,
430: measurement data file,
431: model,
432: correspondence table,
2200: computer,
2201: DVD-ROM,
2210: host controller,
2212: CPU,
2214: RAM,
2216: graphics controller,
2218: display device,
2220: input/output controller,
2222: communication interface,
2224: hard disk drive,
2226: DVD-ROM drive,
2230: ROM,
2240: input/output chip,
2242: keyboard

What is claimed is:

1. An apparatus comprising:
a computer, wherein the computer is configured to:
acquire a plurality of types of measurement data indicating a state of a target;
supply, in response to the plurality of types of measurement data being input, acquired measurement data to a model that outputs a state indication value indicating a quality of a state of the target;
set, as data to be displayed, at least one piece of measurement data, among the plurality of types of measurement data, affecting the state indication value;
display the state indication value output from the model along with a measurement value of the data to be displayed;
store, in a correspondence table, an improvement operation for improving a measurement value of the measurement data in association with each type of measurement data for which measurement is performed by a sensor; and
identify a type of measurement data that caused a poor state, as well as identify the improvement operation associated with the type of measurement data in the correspondence table, in a case where the state indication value indicates that the target is a poorer state than a reference, wherein
the computer is configured to further display the improvement operation identified by the identification unit.

2. The apparatus according to claim 1, wherein the computer is configured to display a representative value of a measurement value for each piece of data to be displayed when the target is in a good state, and a measurement value of the data to be displayed together.

3. The apparatus according to claim 2, wherein the computer is configured to display, for each of the data to be displayed, a representative value thereof and a most recent measurement value as a graph.

4. The apparatus according to claim 3, wherein the computer is configured to display a scale indicating reference divergence from the representative value in the graph.

5. The apparatus according to claim 1, wherein the computer is configured to set, as the data to be displayed, measurement data of a reference number determined by the modeling to have a largest degree of influence on the state indication value, among the plurality of types of measurement data.

6. The apparatus according to claim 2, wherein the computer is configured to set, as the data to be displayed, measurement data of a reference number determined by the modeling to have a largest degree of influence on the state indication value, among the plurality of types of measurement data.

7. The apparatus according to claim 1, wherein the computer is configured to set, as the data to be displayed, measurement data determined by the modeling to have a larger degree of influence on the state indication value than a preset reference degree, among the plurality of types of measurement data.

8. The apparatus according to claim 2, wherein the computer is configured to set, as the data to be displayed, measurement data determined by the modeling to have a larger degree of influence on the state indication value than a preset reference degree, among the plurality of types of measurement data.

9. The apparatus according to claim 7, wherein the computer is configured to set, as the data to be displayed, a representative value of a measurement value when the target is in a good state, and measurement data of a reference number having a largest amount of deviation with a most recent measurement value, among the plurality of types of measurement data.

10. The apparatus according to claim 1, wherein the computer further is configured to provide each piece of measurement data measured at a time point specified by an operator with a label indicating a quality of a state of the target.

11. The apparatus according to claim 1, wherein the model is configured to output the state indication value that is not binarized into a value indicating that the target is in a good condition and a value indicating that the target is in a poor state.

12. The apparatus according to claim 1, wherein the computer further is configured to detect a sign indicating that a state of the target is becoming poor based on transition in the state indication value, wherein
the computer is configured to display that a sign has been detected by the detection unit.

13. The apparatus according to claim 12, wherein the computer is configured to compare the state indication value with a preset threshold to detect the sign.

14. The apparatus according to claim 12, wherein the computer is configured to compare a moving average of the state indication value with a preset threshold to detect the sign.

15. The apparatus according to claim 12, wherein the computer is configured to compare a distribution of the state indication value during a most recent period and a reference distribution to detect the sign.

16. The apparatus according to claim 1, wherein the target is a facility.

17. A method comprising:
- setting, as data to be displayed, in response to a plurality of types of measurement data indicating a state of a target being input, at least one piece of measurement data having been determined by modeling to be influential with respect to a state indication value indicating a quality of a state of the target that is output from a model;
- setting, as data to be displayed, at least one piece of measurement data, among the plurality of types of measurement data, affecting the state indication value more than a reference; and
- acquiring the plurality of types of measurement data;
- supplying, to the model, the measurement data acquired in the acquiring step; and
- controlling display by displaying the state indication value output from the model along with a measurement value of the data to be displayed;
- displaying the state indication value output from the model along with a measurement value of the data to be displayed;
- storing, in a correspondence table, an improvement operation for improving a measurement value of the measurement data in association with each type of measurement data for which measurement is performed by a sensor;
- identifying a type of measurement data that caused a poor state, as well as identifying the improvement operation associated with the type of measurement data in the correspondence table, in a case where the state indication value indicates that the target is a poorer state than a reference; and
- displaying the improvement operation.

18. A non-transitory computer-readable medium having recorded thereon a set of computer-readable instructions that causes a computer to acquire a plurality of types of measurement data indicating a state of a target;
- supply, in response to the plurality of types of measurement data being input, measurement data acquired by the acquisition unit to a model that outputs a state indication value indicating a quality of a state of the target;
- set, as data to be displayed, in response to a plurality of types of measurement data indicating a state of a target being input, at least one piece of measurement data affecting the state indication value of a model that outputs the state indication value indicating a quality of a state of the target; and
- display the state indication value output from the model along with a measurement value of the data to be displayed;
- store, in a correspondence table, an improvement operation for improving a measurement value of the measurement data in association with each type of measurement data for which measurement is performed by a sensor;
- identify a type of measurement data that caused a poor state, as well as identify the improvement operation associated with the type of measurement data in the correspondence table, in a case where the state indication value indicates that the target is a poorer state than a reference; and
- display the improvement operation.

19. A non-transitory computer-readable medium having recorded thereon a set of computer-readable instructions that causes a computer to:
- set, as data to be displayed, in response to a plurality of types of measurement data indicating a state of a target being input, at least one piece of measurement data affecting a state indication value of a model that outputs the state indication value indicating a quality of a state of the target; and
- display the state indication value output from the model along with a measurement value of the data to be displayed;
- store, in a correspondence table, an improvement operation for improving a measurement value of the measurement data in association with each type of measurement data for which measurement is performed by a sensor;
- identify a type of measurement data that caused a poor state, as well as identify the improvement operation associated with the type of measurement data in the correspondence table, in a case where the state indication value indicates that the target is a poorer state than a reference; and
- display the improvement operation.

\* \* \* \* \*